United States Patent [19]
Ohtsuka et al.

[11] Patent Number: 5,361,115
[45] Date of Patent: Nov. 1, 1994

[54] CAMERA

[75] Inventors: Masanori Ohtsuka; Kazunari Kitani, both of Kanagawa, Japan

[73] Assignee: Canon Kabushiki Kaisha, Tokyo, Japan

[21] Appl. No.: 125,345

[22] Filed: Sep. 22, 1993

Related U.S. Application Data

[63] Continuation of Ser. No. 941,870, Sep. 8, 1992, abandoned, which is a continuation of Ser. No. 510,551, Apr. 18, 1990, abandoned.

[30] Foreign Application Priority Data

Apr. 21, 1989 [JP] Japan .............................. 1-102047
Apr. 21, 1989 [JP] Japan .............................. 1-102048

[51] Int. Cl.$^5$ .............................................. G03B 13/36
[52] U.S. Cl. ..................................... 354/400; 354/81; 354/432; 318/640; 318/648
[58] Field of Search ................. 354/400, 402, 403, 81, 354/293, 432; 352/140; 318/640, 648; 362/261

[56] References Cited

U.S. PATENT DOCUMENTS

| | | | |
|---|---|---|---|
| 4,067,015 | 1/1978 | Mogavero et al. | 362/269 |
| 4,239,356 | 12/1980 | Freudenschuss et al. | 352/140 |
| 4,534,629 | 8/1985 | Bogle et al. | 352/140 |
| 4,601,557 | 7/1986 | Bogle et al. | 352/140 |
| 4,905,315 | 2/1990 | Solari et al. | 318/640 |
| 4,980,871 | 12/1990 | Sieber et al. | 318/648 |
| 5,012,335 | 4/1991 | Cohodar | 354/81 |
| 5,014,080 | 5/1991 | Miyadera | 354/403 |

*Primary Examiner*—Russell E. Adams
*Attorney, Agent, or Firm*—Robin, Blecker, Daley & Driscoll

[57] ABSTRACT

The present patent application discloses a camera provided with judging means for automatically judging the direction in which an object to be photographed is located, and control means for correctly controlling the camera by obtaining measured distance information and/or measured light information of the direction in which the object is located on the basis of an output of the judging means.

65 Claims, 13 Drawing Sheets

CAMERA

This is a continuation application under 37 CFR 1.62 of prior application Ser. No. 941,870, filed Sep. 8, 1992,(now abandoned) which is a continuation of application Ser. No. 510,555, filed Apr. 18, 1990 (now abandoned).

BACKGROUND OF THE INVENTION

1. Field of the Invention

This invention relates to cameras and, more particularly, to cameras suited to remote manipulation.

2. Description of the Related Art

The remote-control capability that has so far been introduced into the camera operates after the photographer has set the camera body on a camera fixing member such as a tripod and has determined a desired composition in the picture frame. He then walks up to the front of the camera and then activates the remote-control transmitter. It has also been known in Japanese Patent Publication No. Sho 52-29931 to provide a remote-controlled motor-driven tripod. With the use of this, the photographer, while standing away from the front of the camera, can operate the motor-driven tripod by means of the remote-control transmitter to control the direction of the camera.

However, the cameras having these remote-control capabilities have a drawback that the determined composition can not be altered, or that even if the alteration is possible, the handling for it is troublesome, because it has to be done manually (by using the remote-control transmitter). Another drawback arising from the use of the motor-driven tripod is that when the direction of the camera is manually altered, the photographer can hardly guess where his image as the object of principal interest takes its place within the picture frame. Further, in a case where the image of the object does not lie at the center of the area of the picture frame, in the automatic focus detector-equipped camera or the automatic exposure controller-equipped camera, the adequate focus adjustment or the accurate exposure control can no longer be made.

SUMMARY OF THE INVENTION

With the foregoing situations in mind, the present invention has been made and is to provide a camera including judging means for automatically judging a direction in which an object to be photographed is located, and control means for obtaining distance measurement information and light measurement information of the direction in which the object is located on the basis of an output of the judging means to correctly control the camera, wherein regardless of the position at which the object is located, an always correct photographic condition is automatically set.

Other objects of the invention will become apparent from the following detailed description of embodiments thereof.

DETAILED DESCRIPTION OF THE PREFERRED EMBODIMENTS

Figure 1:
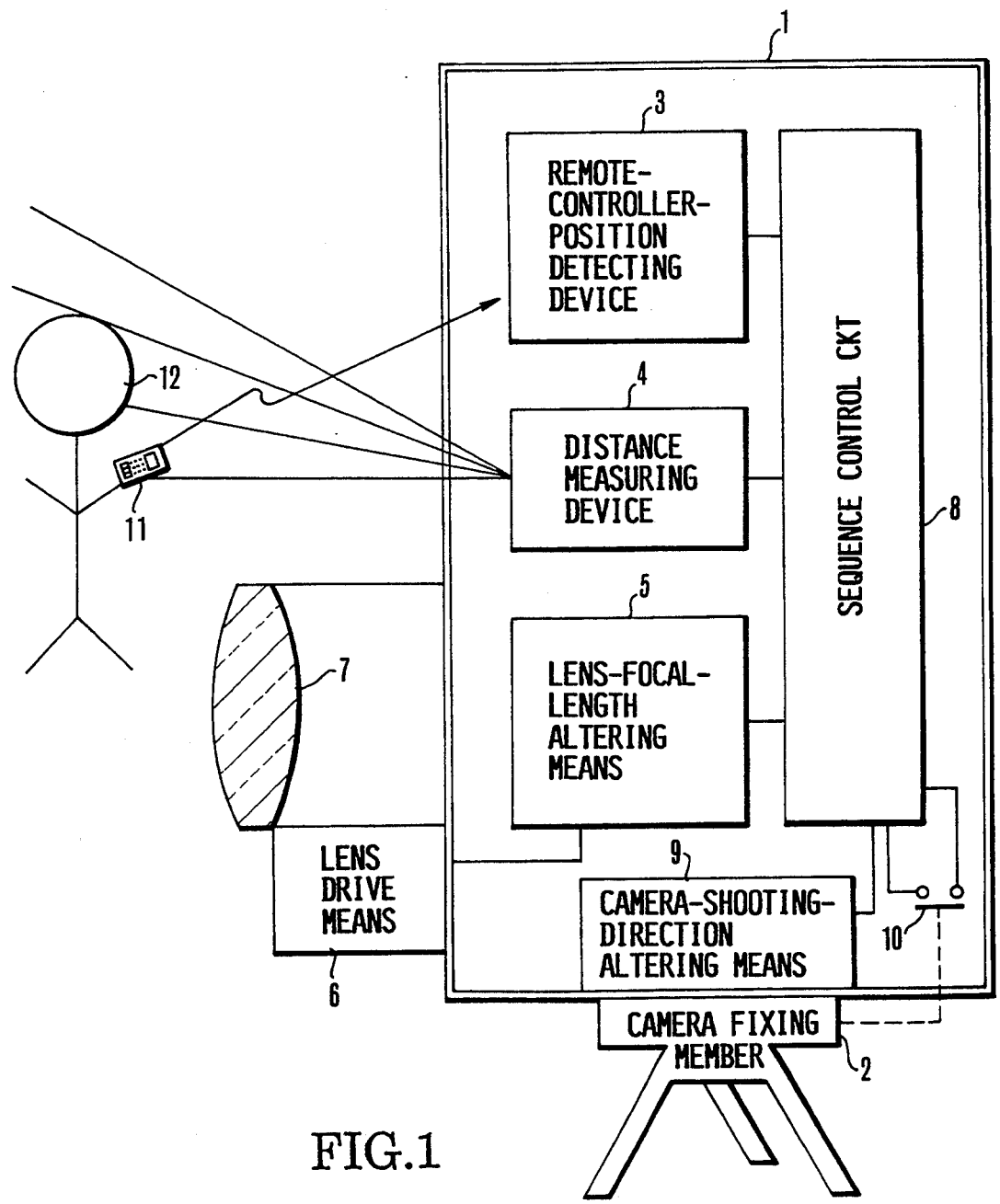
FIG. 1 is a block diagram illustrating the construction of an embodiment of a camera according to the invention.

FIG. 1 in block diagram shows an embodiment of the camera according to the invention comprising a camera body 1, a camera fixing member 2, a remote-controller-position detecting device 3 receptive of a signal from a remote-control transmitter 11 for detecting a direction of the position at which the transmitter 11 is located, a known distance measuring device 4 for measuring the distance of an object to be photographed, a lens-focal-length altering means 5 for altering the focal length of a photographic lens 7, a lens drive means 6 responsive to the output of the altering means 5 for moving the photographic lens 7 to alter the focal length, and a sequence control circuit 8 in the form of a microcomputer or the like. The sequence control circuit 8 not only governs the operation of shooting film frames in the camera but also has functions of performing computation based on a position signal output from the remote-controller-position detecting device 3, sending a control signal to the distance measuring device 4 when the object distance is measured, computing the data of the measured distance, sending a control signal to the lens-focal-length altering means 5 to set the focal length of the photographic lens 7 to a certain value, and sending a control signal to a camera-shooting-direction altering means 9 for controlling the direction of the camera body 1 by driving the camera fixing member 2. The camera-shooting-direction altering means 9 is fixed to the camera fixing member 2. A switch 10 is arranged to turn on when the camera body 1 is equipped with the camera fixing member 2. An object 12 to be photographed, in this instance, is a person with the remote control transmitter 11 on his hand.

Figures 2A, 2B, 2C:
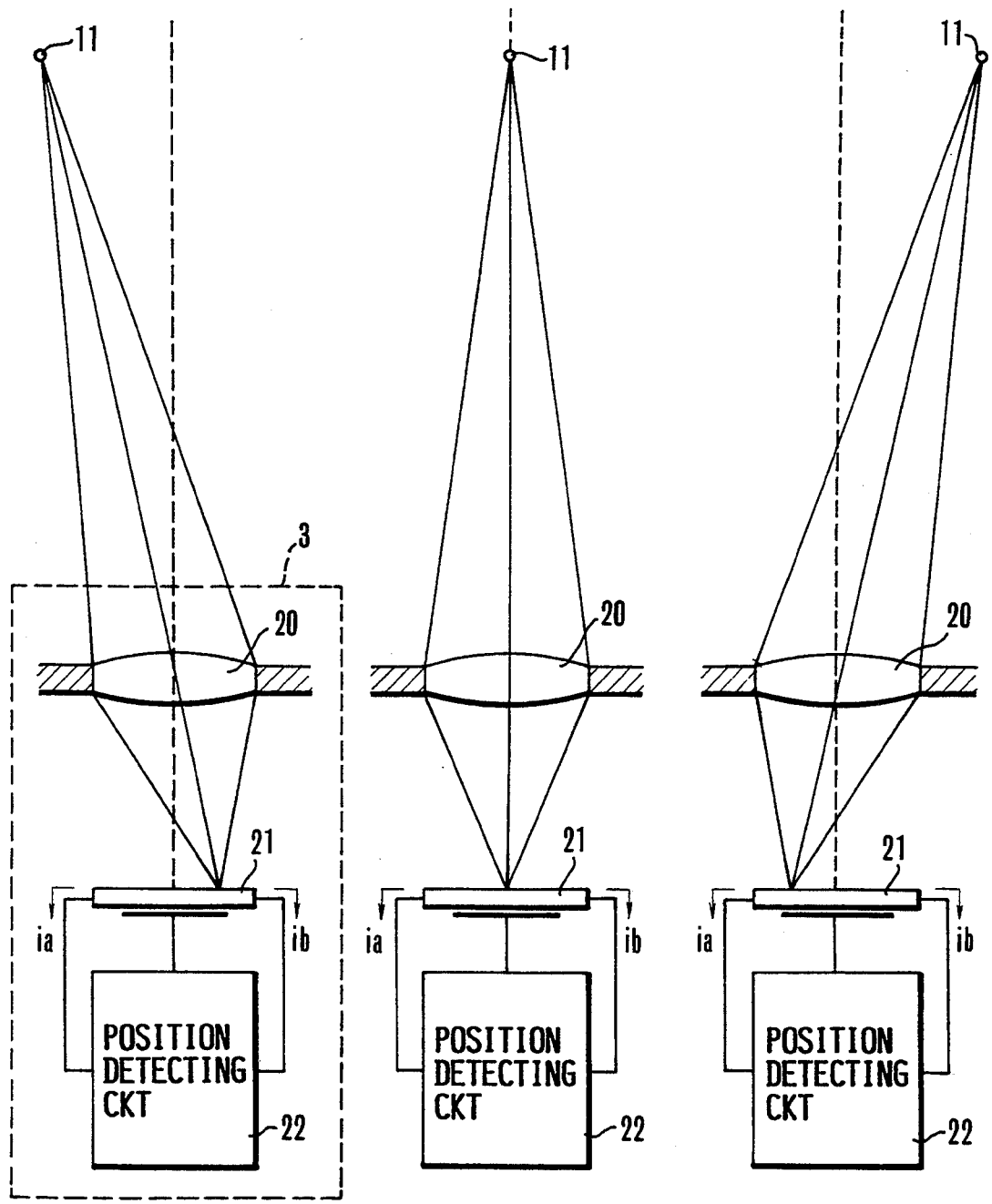
FIGS. 2(a), 2(b) and 2(c) are diagrams of geometry taken to explain the arrangement of a remote-controller-position detecting device shown in FIG. 1 and its function.

FIGS. 2(a), 2(b) and 2(c) are diagrams of geometry taken to explain the operational principle of the remote-controller-position detecting-device 3 shown in FIG. 1. A lens 20 is positioned in a front stage of a position detecting circuit 22 having a two-dimensional PSD or like area sensor 21.

In the above-described arrangement, in a first case where the remote-control transmitter 11 lies on the left side of a vertical plane of sight as viewed in the drawing (in the case of FIG. 2(a)), a photo signal emitting from the remote-control transmitter 11 is collected by the lens 20 and is focused to a spot on the area sensor 21. Depending on the location of the spot on the area sensor 21, its output currents take values "ia" and "ib". And, as known in the art, the position detecting circuit 22 performs computation of (ia−ib)/(ia+ib). Information representing how much the location of the light spot is horizontally deviated from the vertical center line of the area of the sensor 21 is transmitted to the sequence control circuit 8.

FIG. 2(b) shows another case where the remote-control transmitter 11 is in the vertical plane of sight, and FIG. 2(c) shows yet another case where the remote-control transmitter 11 lies on the right side as viewed in the drawing. In each of these cases, a similar signal processing is carried out.

It is to be noted that though the explanation on these cases has been made only in an one-dimensional sense, a similar treatment is performed even in the perpendicular direction to this, or the vertical direction. Thus, the two-dimensional position detection is effected.

Figure 3A:
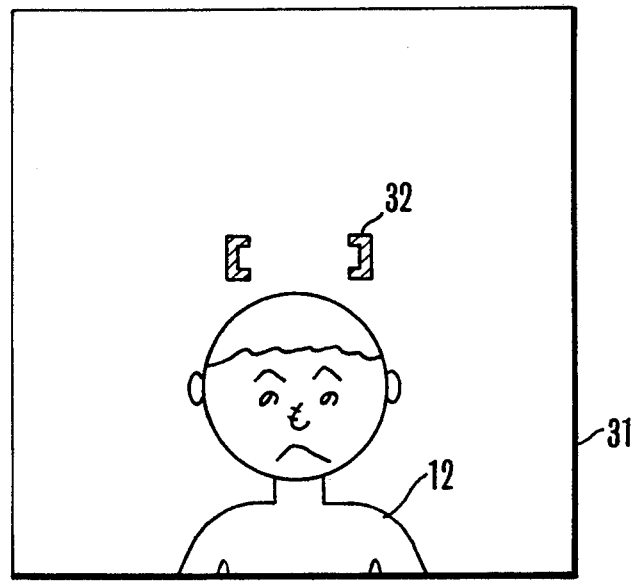
FIGS. 3(a), 3(b) and 3(c) are pictorial representations of different locations of an image of an object in the picture frame in the camera of FIG. 1.
Figure 3B:
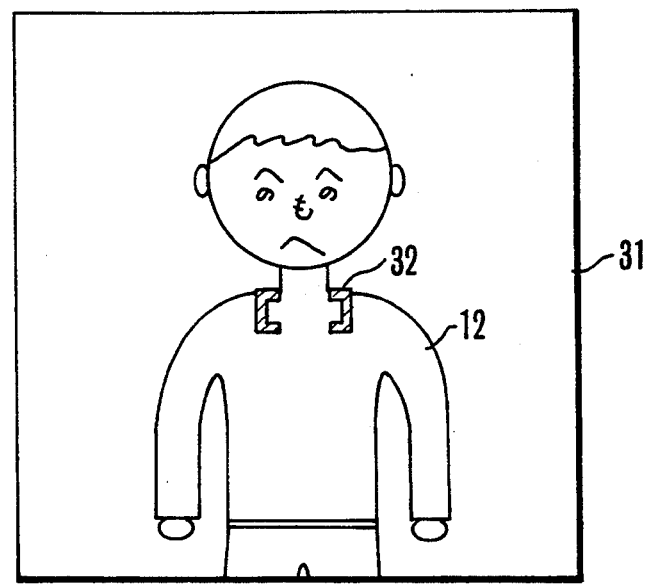
Figure 3C:
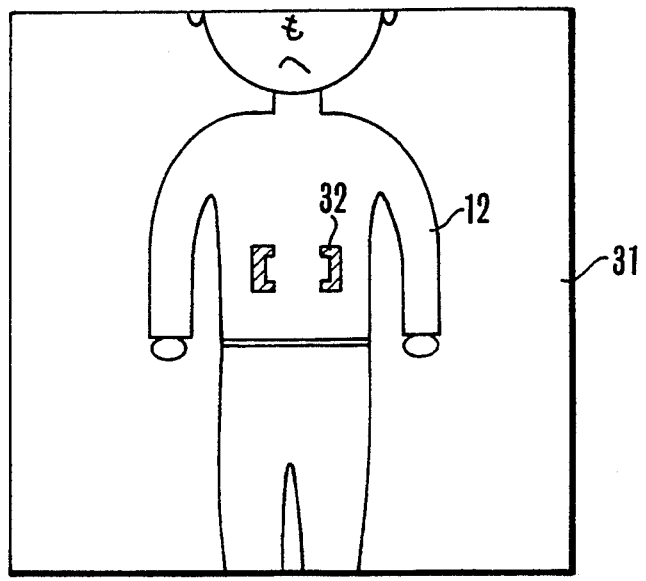

FIGS. 3(a), 3(b) and 3(c) show the locations of an object on the vertical center line within the picture frame. In FIG. 3(a), the object 12 takes its place in the lower half of the picture frame 31. So, a mark 32 indicating the position whose distance is to be measured (hereinafter described as the "distance measuring zone") is caused to aim at (measure the distance of) the background of the object 12. In FIG. 3(b), the object 12 is in adequate composition. In FIG. 3(c), the part of principal interest of the object 12 is out of the picture frame 31.

Figure 4:
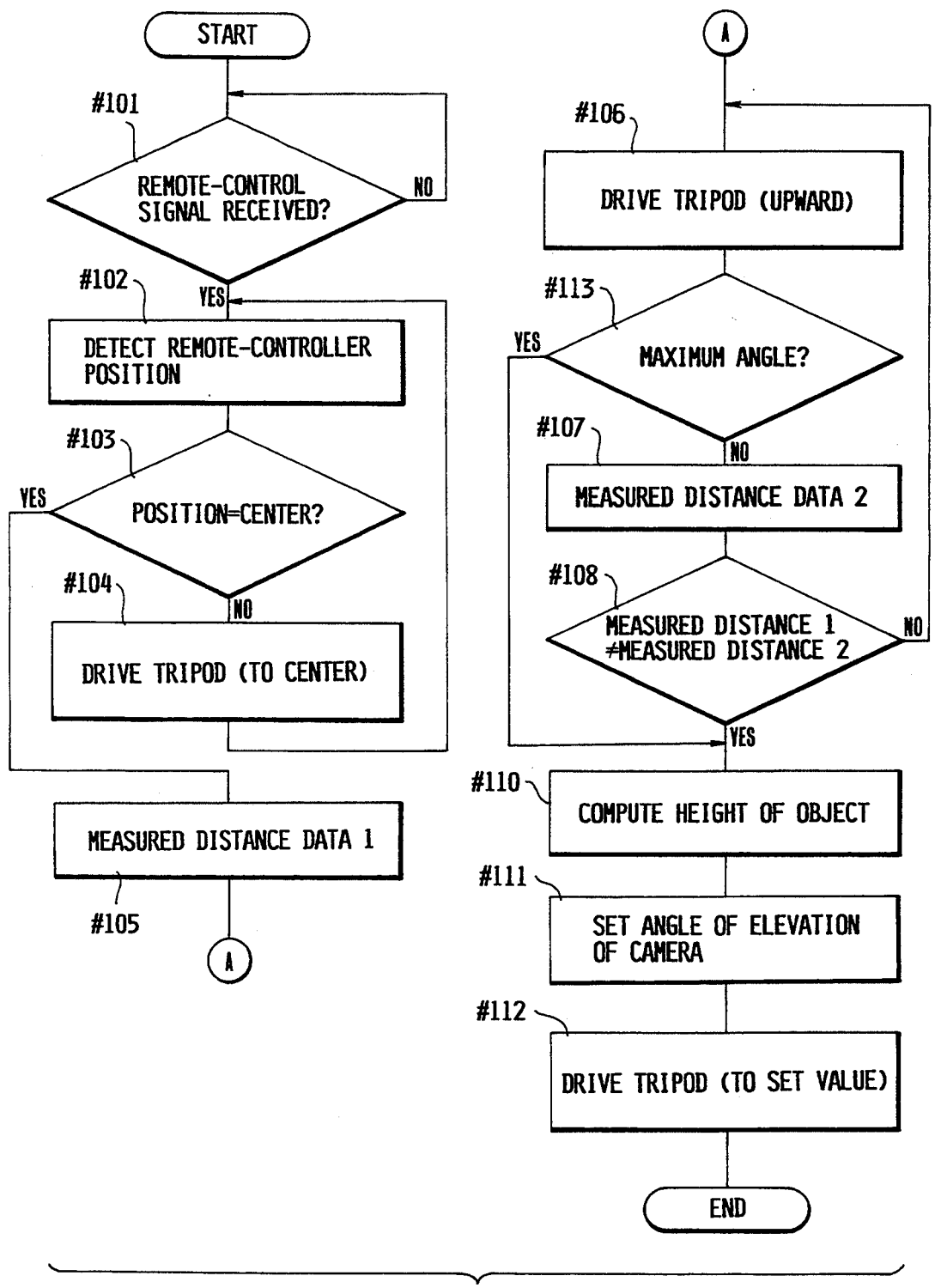
FIG. 4 is a flowchart illustrating a manner in which the camera of FIG. 1 operates.

Next, the operation of the camera of FIG. 1 is described by following the flowchart of FIG. 4.

The sequence control circuit 8 tests whether or not the remote-controller-position detecting device 3 has received a remote-control signal (#101). If the remote-control signal is in receipt, the sequence control circuit 8 sends a control signal to the remote-controller-position detecting device 3. Thus, detection of a direction of the position at which the remote-control transmitter 11 is located, is initiated (#102). On receipt of the operation start signal from the sequence control circuit 8, the remote-controller-position detecting device 3, as has been described in connection with FIGS. 2(a), 2(b) and 2(c), produces an output signal representing the direction of the position of the remote-control transmitter 11 in the form of the amount of deviation from the vertical center plane. Based on this signal, the sequence control circuit 8 sends a signal to the camera-shooting-direction altering means 9 of FIG. 1, so that until the signal output from the remote-controller-position detecting device 3 becomes the central location signal (#103), the camera-shooting-direction altering means 9 is driven (#104). Thus, the direction of the camera fixing member 2, or the direction of the camera body 1, is altered so that the image of the object 12 takes its place on the vertical center line of the area of the picture frame and when the central vertical plane of sight is brought in registry with the object 12 as he has the remote-control transmitter 11 in his hand (#103), the sequence control circuit 8 then sends a control signal to the distance measuring device 4, so that the distance to the object 12 having the remote-control transmitter 11 is detected. In return, the sequence control circuit 8 receives and memorizes the measured distance data (#105). This is regarded as measured distance data 1 for the object distance.

Subsequently, the process advances to an operation of finding out the height of the object 12 as measured in the vertical direction of the picture frame by tilting the camera body 1 upward or downward, while carrying out a series of distance measurements. That is, the sequence control circuit 8 sends a signal to the camera-shooting-direction altering means 9 (#106), and the camera body 1 starts to tilt upward. After it has moved a predetermined angle, a control signal is sent to the distance measuring device 4 so that the object distance measuring operation is carried out again (#107). Whether or not the measured distance data of the present time is equal to the first measured distance data is then examined (#108). If they are equal to each other, another upward tilting for the predetermined angle proceeds (#106). Then the distance measurement is carried out (#107), and the new data of the measured distance is compared with the first measured distance data (#108). If they are again equal to each other, recycling of the upward tilting goes on. Such a procedure repeats itself either until they become different from each other, or until the camera-shooting-direction altering means 9 reaches the maximum possible tilting angle (#113). When this series of cycles of operations ends, the thus-obtained data about the distance and the tilted angle are computed to determine the location (angle) of the object image in the picture frame (#110). In the next step (#111), the focal length of the photographic lens 7 is factored in determining a proper composition of the object in the picture frame, for which the angle of elevation of the camera body 1 is set. To adjust the tilting to this angle, the control signal is sent to the camera-shooting-direction altering means 9.

It should be noted here that in a case where, even though the angle of elevation of the camera-shooting-direction altering means 9 has reached the maximum angle, the measured distance data remains the same as the first measured distance data, in other words. In a case where the height of that portion of the object which lies in the vertical center line of the picture frame could not be detected, the setting of the angle of elevation is revised to the value the photographer has previously chosen at the beginning (#111). To tilt the camera to this angle, the control signal is sent to the camera-shooting-direction altering means 9.

Figure 5:
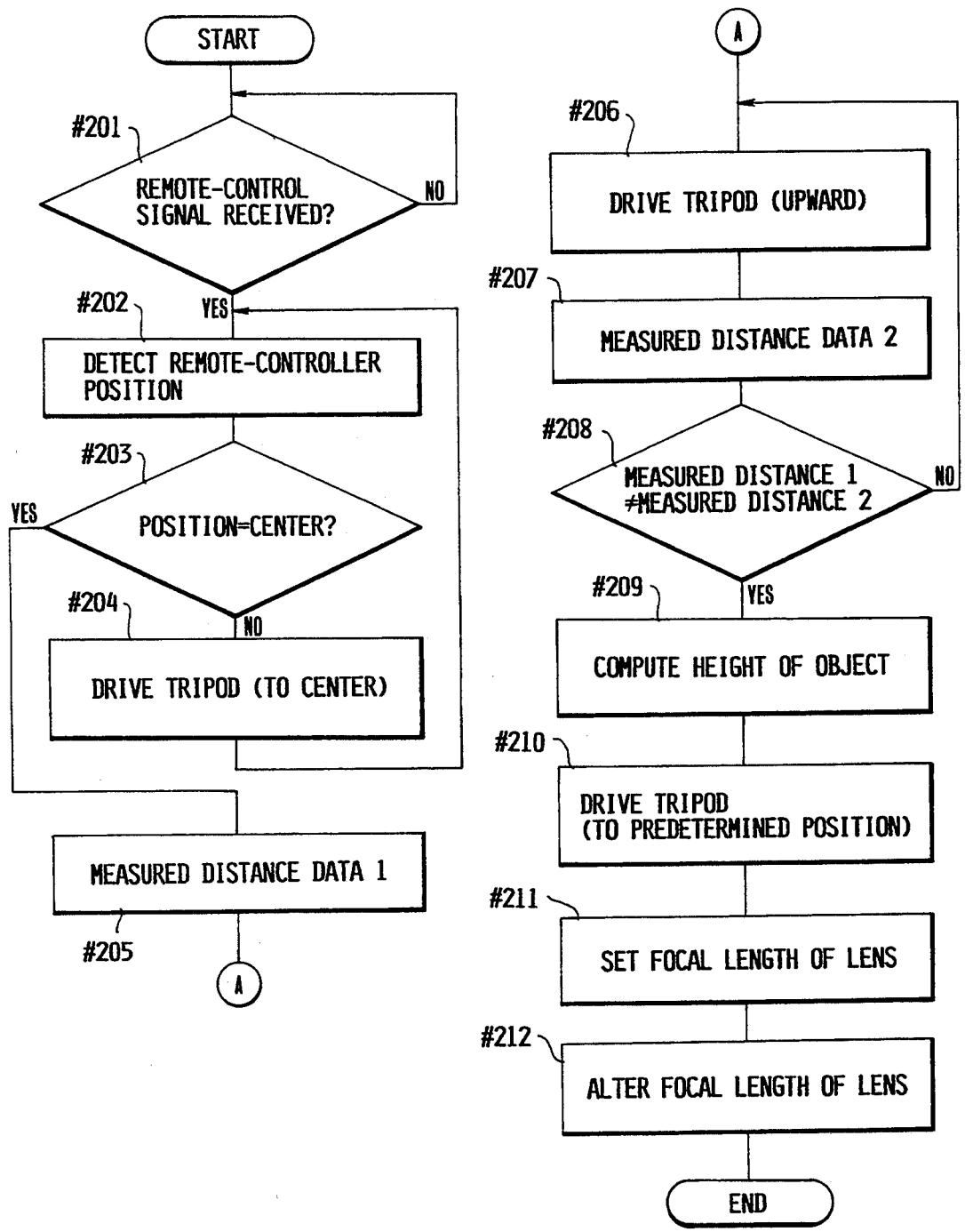
FIG. 5 is a flowchart for another example of the operation of the camera of FIG. 1.

FIG. 5 is a flowchart for the operation of another example of the camera of FIG. 1. A sequence of operations of detecting an object 12 having the remote-control transmitter 11 in his hand, bringing the vertical central line of the picture frame into registry with the object image, and measuring distances along the line of sight to find the height of the image of the object 12 as measured in the vertical center line of the picture frame, that is, steps #201 to #209, are identical to those of the steps #101 to #106 of the flowchart of FIG. 4. And further explanation thereof is unnecessary here.

After the height (angle) of the object 12 in the vertical plane of sight has been found out (#209), the sequence control circuit 8 sends a control signal to the camera-shooting-direction altering means 9 so that the tilting of the camera is reset to the angle the photographer has set at the beginning (#210). Subsequently, from the height (angle) of the object 12 in the vertical plane of sight, an adequate composition is determined, for which the focal length (zoom ratio) of the photographic lens is set (#211). A control signal is sent to the lens-focal-length altering means 5 (#212). In the lensfocal-length altering means 5, actually by the lens drive means 6, the photographic lens 7 is moved.

Figure 6:
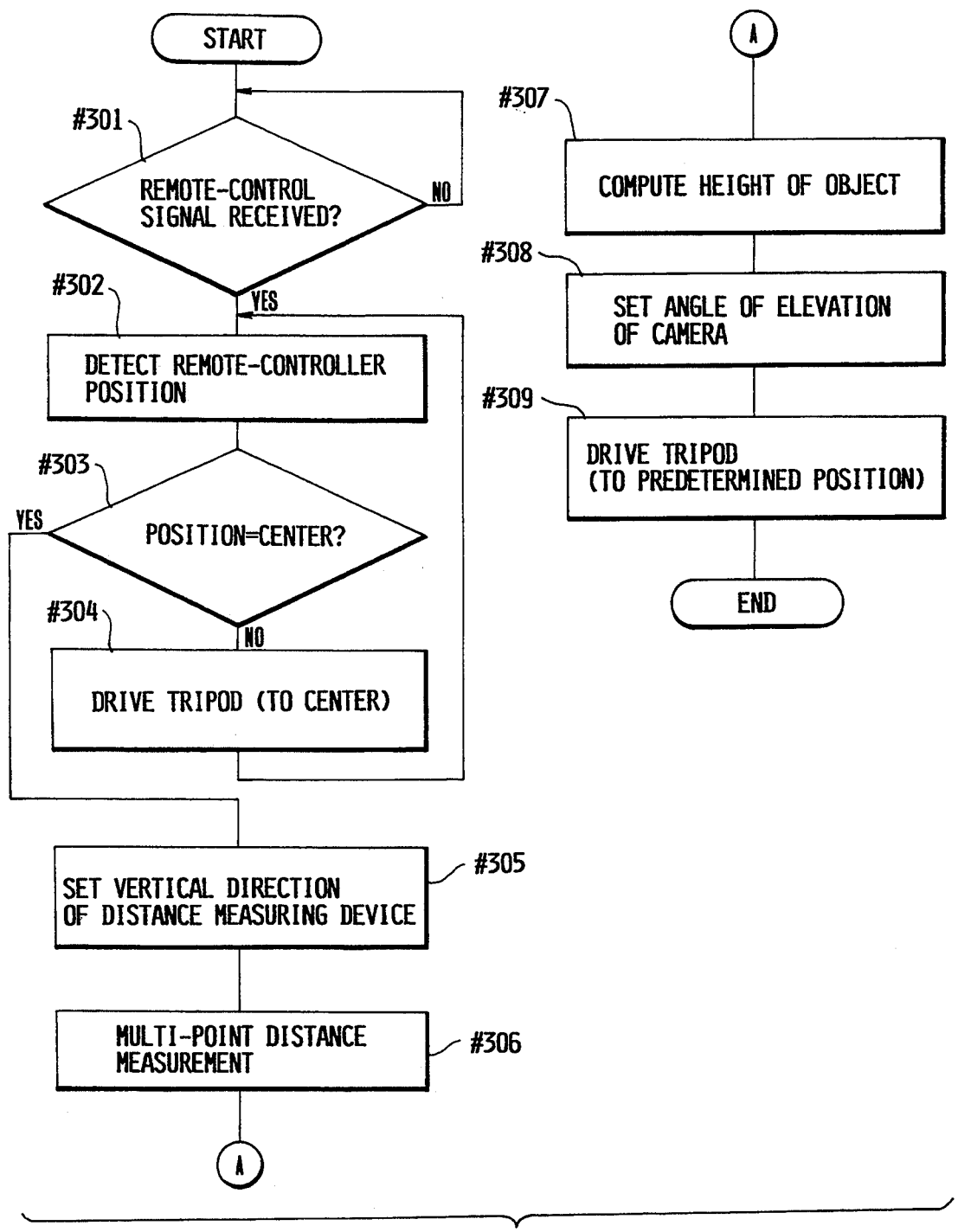
FIG. 6 is a flowchart for still another example of the operation of the camera of FIG. 1.

FIG. 6 is a flowchart for the operation of another example of finding the height of the object 12 having the remote-control transmitter 11 in the vertical plane of sight in the camera of FIG. 1.

In FIG. 6, the sequence control circuit 8 tests whether or not the remote-controller-position detecting device 3 has received a remote-control signal (#301). If the remote-control signal is in receipt, the sequence control circuit 8 sends a control signal to the remote-controller-position detecting device 3, causing the start of detection of the position of the remote-control transmitter 11 (#302). On receipt of the operation start signal from the sequence control circuit 8, the remote-controller-position detecting device 3, as has been described in connection with FIGS. 2(a), 2(b) and (c), produces an output signal representing the position of the remote-control transmitter 11 in the form of the amount of deviation from the vertical plane of sight. Based on this signal, the sequence control circuit 8 forms a signal which is supplied to the camera-shooting-direction altering means 9 of FIG. 1 so that, until the signal from the remote controller-position detecting device 3 becomes a signal representing that the object 12 is in the vertical plane of sight (#303), the camera-shooting-direction altering means 9 is tilted (#304). When the vertical plane of sight has hit the object 12 having the remote-control transmitter 11 in his hand (#303), the setting of the distance measuring device 4 is then changed. It is to be noted that the distance measuring device 4 herein used has a plurality of iREDs or like light projecting elements and a number of light receiving elements corresponding to the number of light projecting elements, so that the distances to a plurality of points in the target area can be measured, or is of the wide angle-of-view type. It is a common practice in many cases that when the distances to a plurality of points over a wide angular field are measured, all the points are arrayed to one horizontal row in the target area. In a step #305, therefore, when the camera is tilted, a control signal is sent to the distance measuring device 4 so that it is responsive to a plurality of points in a vertical row in the target area. After this operation is completed, another control signal is sent to the distance measuring device 4 so as to actually carry out a multi-point distance measurement. Based on the data of the measured distances of these multiple points, the height of the object in the vertical plane of sight is determined by computation. With the wide angular field distance measuring unit having, for example, 7 points for distance measurement in the vertical direction, if the lower four points in the picture frame are found to have the same distance, while the upper three points are found to have infinite distances, the lower four points are taken as the object 12, and the boundary between the object and the background is determined to fall in the space between the fourth and fifth points, counting from below. Under this condition, the angle of elevation of the boundary is computed (#307). By taking into account this height (angle) of the object 12 in the vertical plane of sight, an adequate angle of elevation of the camera is set (#308). The camera is then tilted to this angle of elevation when the control signal is sent to the camera-shooting-direction altering means 9 (#309).

Figure 7:
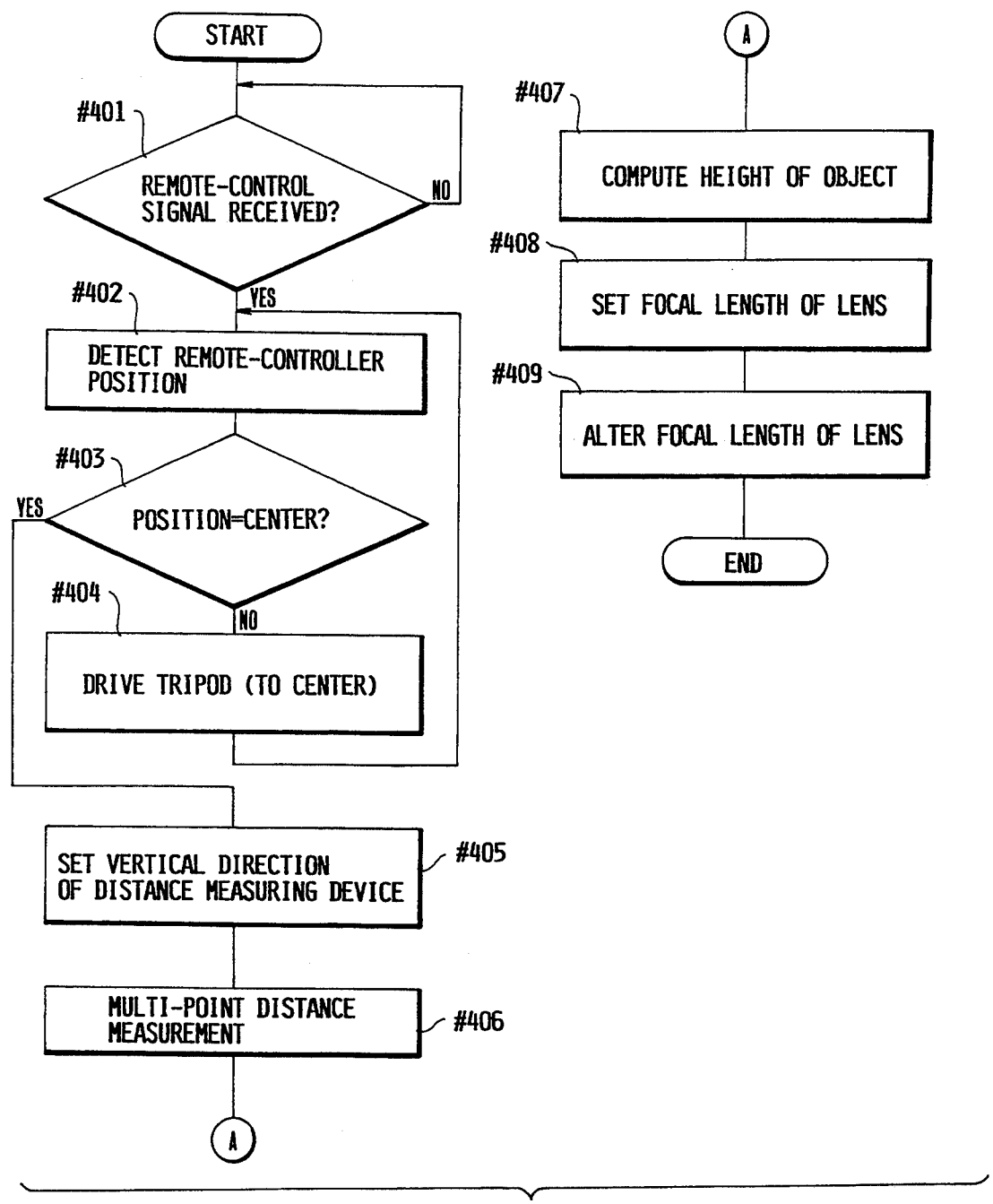
FIG. 7 is a flowchart for the operation of a further example of the camera of FIG. 1.

FIG. 7 is a flowchart for the operation of another example of the camera of FIG. 1 wherein the distance measuring device 4 of the wide angular field type in FIG. 6 is switched to the mode responsive to the vertical direction to obtain the height of the object 12 in the vertical plane of sight, and, after that, the focal length of the photographic lens 7 is changed to get an adequate composition of the object 12. Here the steps #401 to #407 correspond to the steps #301 to #307 in FIG. 6, and the steps #408 and #409 correspond to the steps #211 and #212 of FIG. 5. And further explanation thereof is unnecessary.

According to the foregoing embodiment, the direction in which the object 12 having the remote-control transmitter 11 is located is first detected, and the camera is tilted until an image of the object is positioned in registry with the vertical center line of the picture frame. Under this condition, the distance to the object with its image at the center of the area of the picture frame is measured. Then, the camera is tilted so that the distance measurement scans in the vertical plane of sight to find the height of that portion of the object 12 which lies in the vertical plane of sight. After that, either the angle of elevation of the camera is automatically set, or the focal length of the photographic lens 7 is automatically varied as the necessity arises. Hence, it is made possible to establish an adequate object composition by automatic zooming or automatic trimming without having to burden the photographer with troublesome management.

Though, in the embodiment described above, the camera-shooting-direction altering means 9 has been controlled so as to position the object 12 having the remote-control transmitter 11 in registry with the center of the area of the picture frame of the camera, it is to be understood that this is not confined to the central position. It is needless to say that the index point may be freely set by means of a circuit for adding or subtracting an offset value to and from the data in the sequence control circuit 8.

Figure 8:
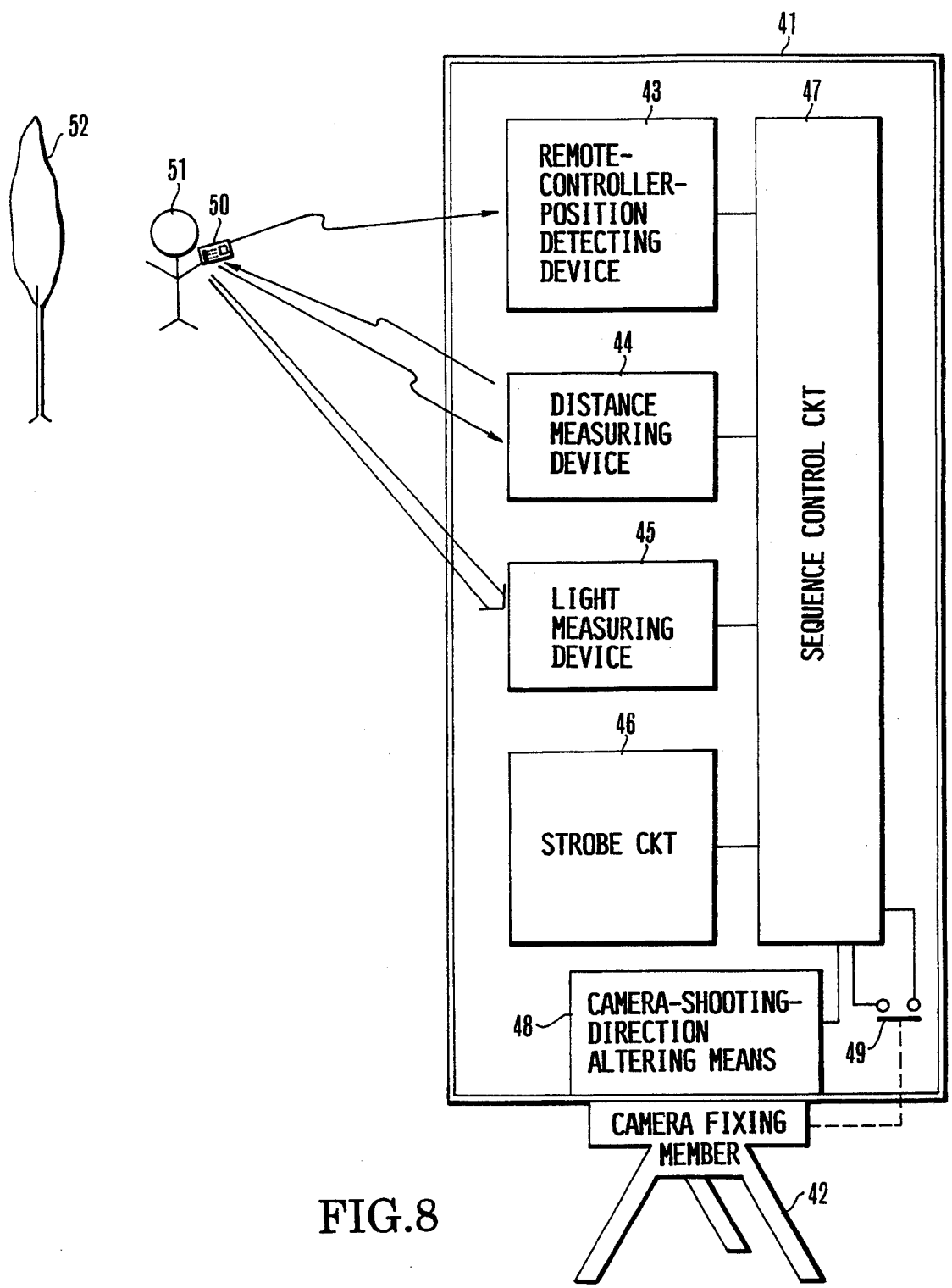
FIG. 8 is a block diagram illustrating the construction of another embodiment of the camera according to the invention.

FIG. 8 is a block diagram illustrating the construction of another embodiment of the camera according to the invention, comprising a camera body 41, a camera fixing member 42, a remote-controller position detecting device 43 for detecting the position of a remote-control transmitter 50 in the target area, which is similar to that described in connection with FIGS. 2(a), 2(b) and 2(c), a distance measuring device 44 for measuring the distance to an object 51 having the remote-control transmitter 50, a light measuring device 45 having a sensor of a plurality of light measuring zones for measuring the brightness of the object 51, a strobe circuit 46 responsive to detection of darkness or backlighting for emitting flash light, and a sequence control circuit 47 in the form of a microcomputer or the like for governing the control of various operations of the camera, performing computation based on a position signal output from the remote-controller-position detecting device 43 to derive the position of the object 51 having the remote-control transmitter 50 in the target area, selecting the light measuring zones, and altering the direction of the camera by a camera-shooting-direction altering means 48. The altering means 48 is constructed from a motor-driven tripod or the like for driving the camera fixing member 42 to alter the direction of the camera body 41. A switch 49 is arranged to turn on when the camera is equipped with the camera fixing member 42. Reference numeral 50 denotes the remote-control transmitter described above, reference numeral 51 denotes the object having the remote-control transmitter 50, and reference numeral 52 denotes another object whose image appears in the common picture frame.

Figure 9A:
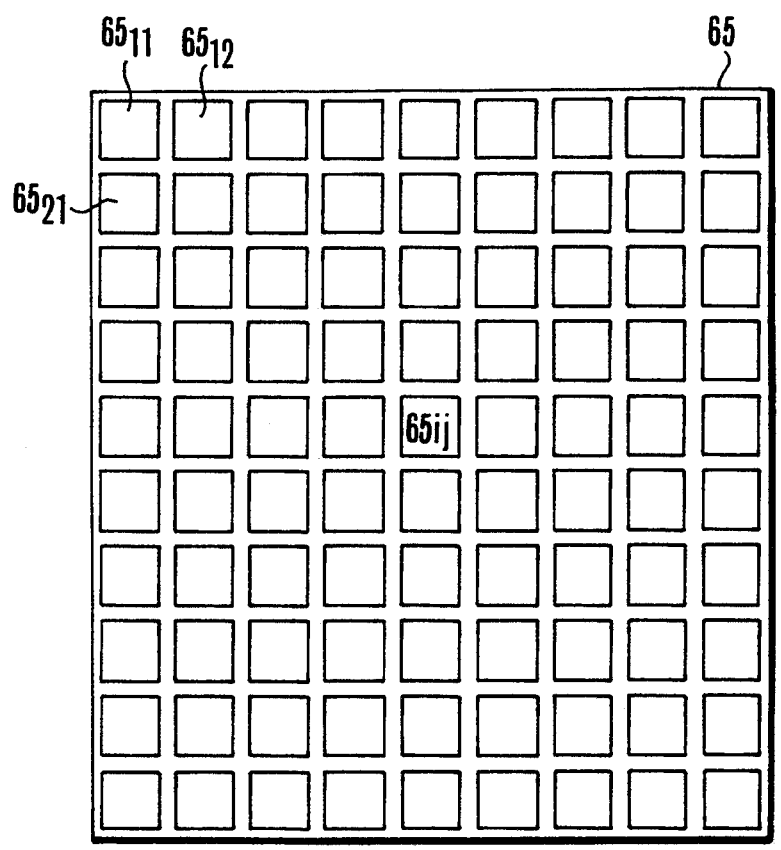
FIGS. 9(a), 9(b) and 9(c) are plan views of examples of the light measuring area used in the camera of FIG. 8.
Figure 9B:
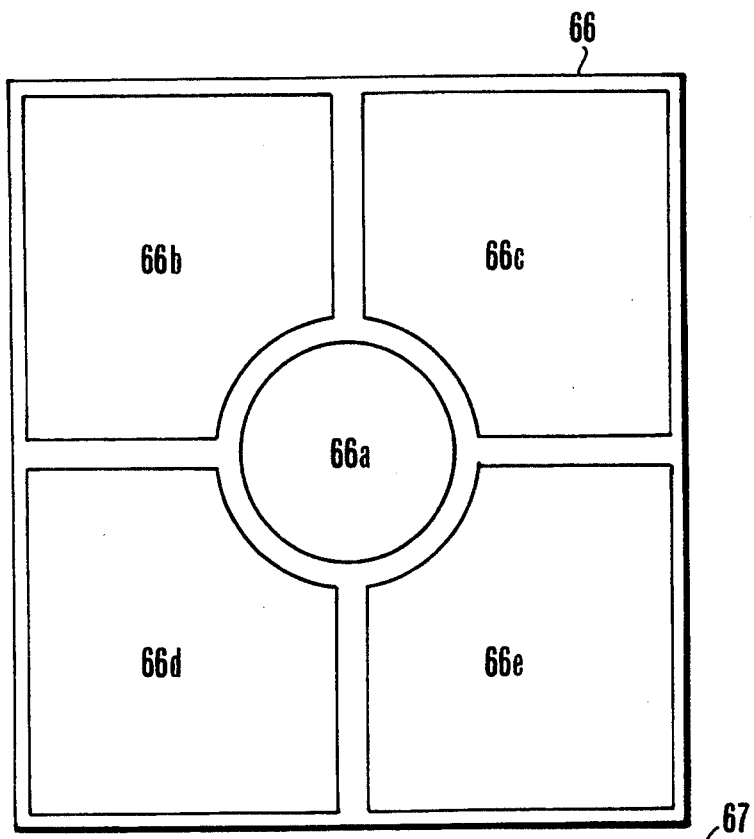
Figure 9C:
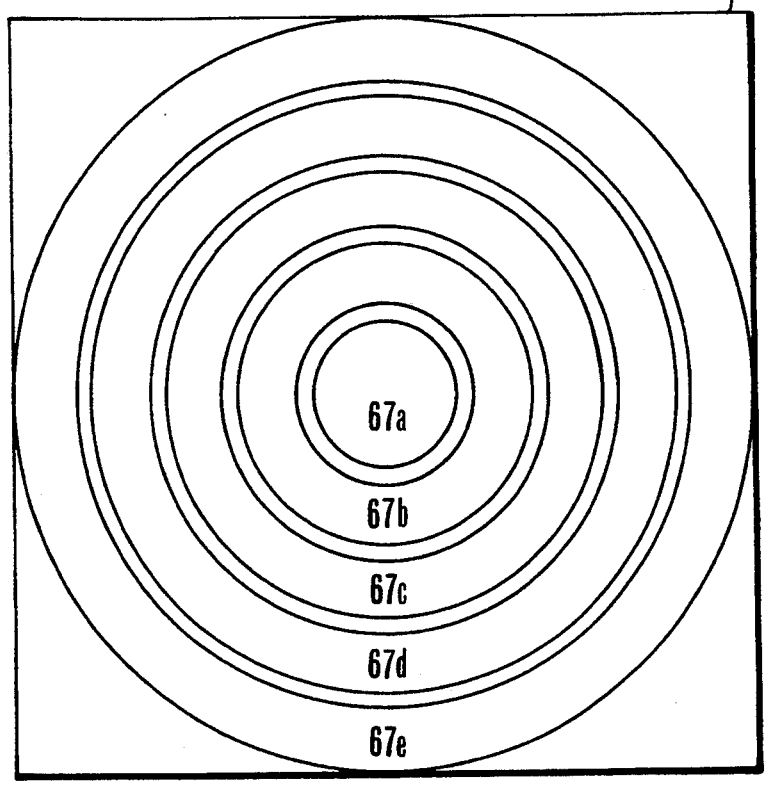

FIG. 9(a), 9(b) and 9(c) show examples of the light measuring sensor having a plurality of zones in the light measuring device of FIG. 8. For the light measuring sensor 65 of FIG. 9(a), its area corresponding to the picture frame is divided into small square parts. The light measuring sensor 66 of FIG. 9(b) is divided, as a whole, into four parts at the corners and a central part, or is of the 5-divided type. The light measuring sensor 67 of FIG. 9(c) is divided into concentric circular zones from the center of the area of the sensor.

Figure 10:
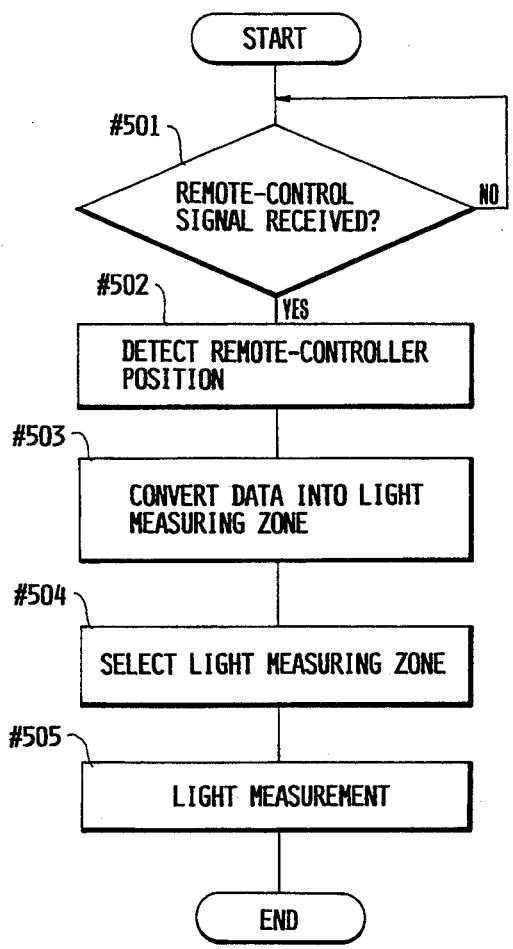
FIG. 10 is a flowchart for an example of the operation of the camera of FIG. 8.

Next, the operation of the camera of FIG. 8 is explained by following the flowchart of FIG. 10.

At first, the object 51 activates the remote-control transmitter 50 to send a remote-control signal. The sequence control circuit 47 tests whether or not the remote-controller-position detecting device 43 has received the remote-control signal (#501). If it is in receipt, a control signal is sent to the remote-controller-position detecting device 43, initiating detection of the direction of the position of the remote-control transmitter 50 (#502). On receipt of the operation start signal from the sequence control circuit 47, the remote-controller-position detecting device 43, as has been described in connection with FIGS. 2(a), 2(b) and 2(c), produces an output signal representing the position of the remote-control transmitter 50 in the form of the amount of deviation from the vertical plane of sight. The sequence control circuit 47 receives this and determines the location of the object 51 having the remote-control transmitter 50 in the target area (#503). From this result, it then carries out a computation for selection of the area (light measuring zone) in the light measuring sensor 65 shown in FIG. 9(a) (that is, for selection of one of the light measuring zones which is to be used in exposure control) (#504) and a control signal is sent to the light measuring device 45 so that a light measuring operation is actually carried out (#505). Thus, the measured light data about the object 51 having the remote-control transmitter 50 is obtained.

Figure 11:
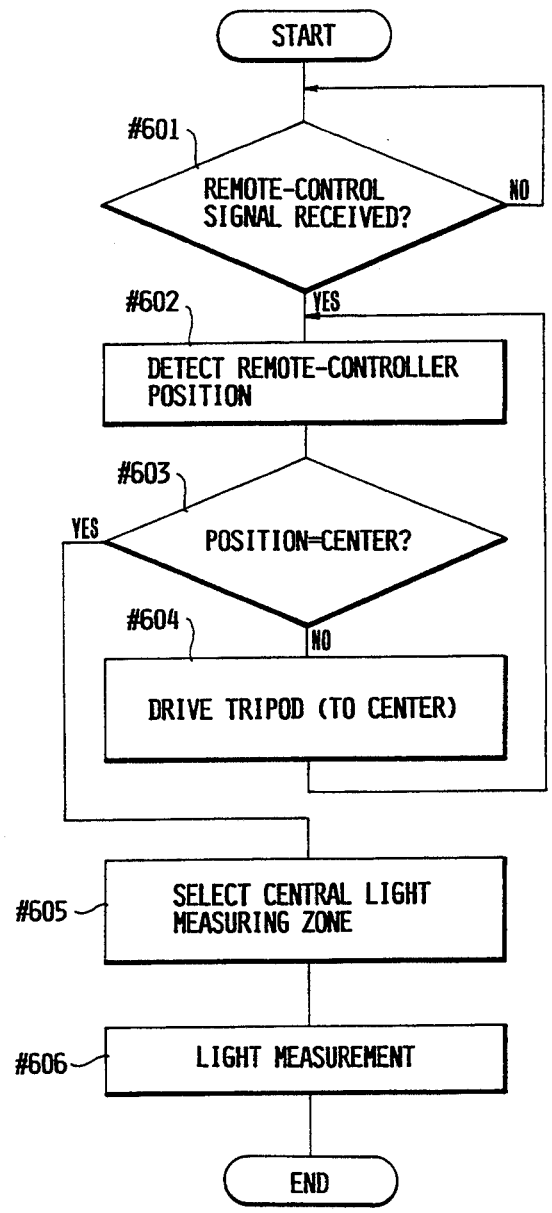
FIG. 11 is a flowchart for another example of the operation of the camera of FIG. 8.

FIG. 11 is a flowchart for the operation of another example of the camera of FIG. 8.

For this example, similarly to the example of FIG. 10, the sequence control circuit 47 tests whether or not the remote-controller-position detecting device 43 has received the remote-control signal (#601). If so, the sequence control circuit 47 sends a control signal to the remote-controller-position detecting device 43, initiating a detection of the position of the remote-control transmitter 50 (#602). On receipt of the operation start signal from the sequence control circuit 47, the remote-controller-position detecting device 43, as has been described in connection with FIGS. 2(a), 2(b) and 2(c), produces an output signal representing the position of the remote-control transmitter 50 in the form of the amount of deviation from the line of sight. The sequence control circuit 47 receives this and forms a signal on the basis of that signal which is sent to the camera-shooting-direction altering means 48 of FIG. 8. Thus, the camera-shooting-direction altering means 48 is driven (#604) until the signal output from the remote-controller position detecting device 43 becomes the central position signal (#603). When the light of sight has hit the object 51 having the remote-control transmitter 50 (#603), a predetermined one (in this instance, a central one) of the zones of the light measuring sensor 66 such as that shown in FIG. 9(b) is selected (#605) and a control signal is sent to the light measuring device 45 so that an actual light measurement is carried out (#606).

Figure 12:
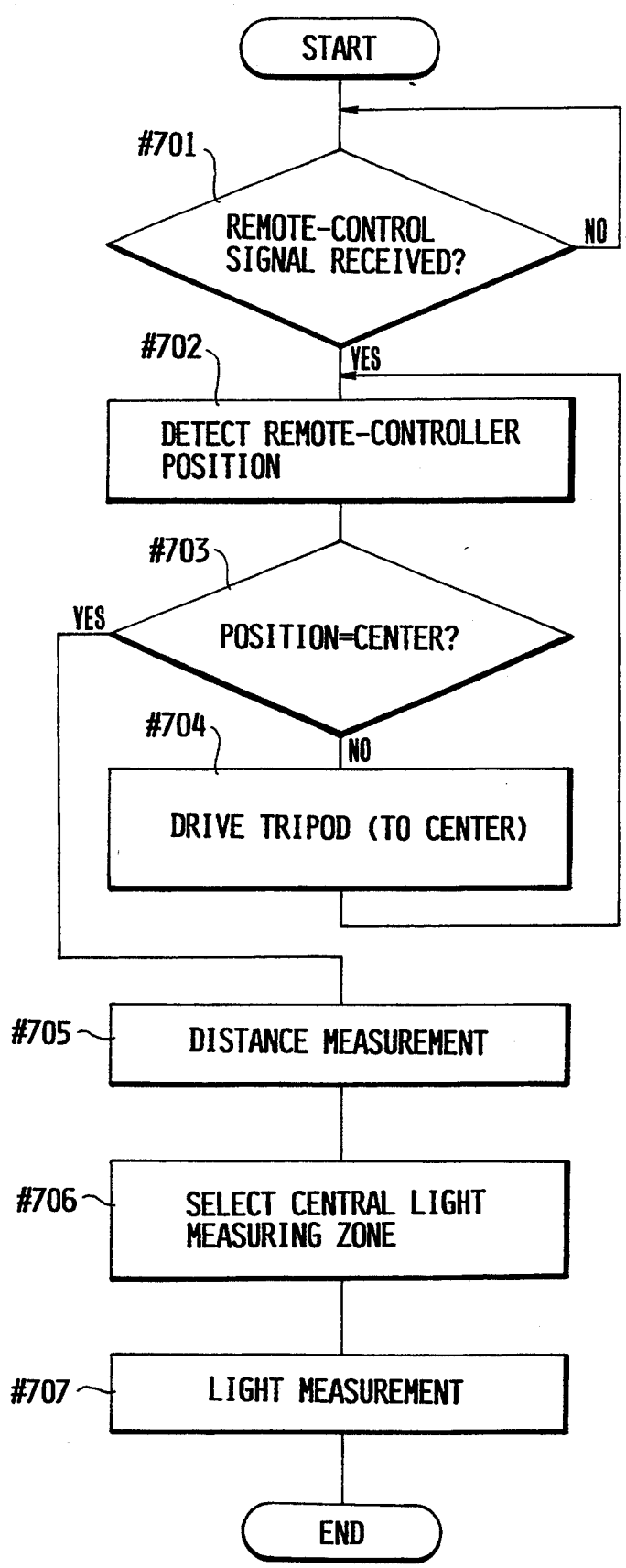
FIG. 12 is a flowchart for still another example of the operation of the camera of FIG. 8.

FIG. 12 is a flowchart for the operation of another example of the camera of FIG. 8.

For this example, similarly to the example of FIG. 11, the sequence control circuit 47 tests whether or not the remote-controller-position detecting device 43 has received the remote-control signal (#701). If so, a control signal is sent to the remote-controller-position detecting device 43, initiating a detection of the position of the remote-control transmitter 50 (#702). On receipt of the operation start signal from the sequence control circuit 47, the remote-controller-position detecting device 43, as has been described in connection with FIGS. 2(a), 2(b) and 2(c), produces an output signal representing the position of the remote-control transmitter 50 in the form of the amount of deviation from the line of sight. The sequence control circuit 47 receives this and, based on this signal, forms a signal which is supplied to the camera-shooting-direction altering means 48 of FIG. 8, driving the camera-shooting-direction altering means 48 (#704) so that the signal output from the remote-controller-position detecting device 43 becomes the central position signal (#703). When the line of sight hits the object 51 having the remote-control transmitter 50 (#703), another control signal which commands the distance measuring device 44 to find the distance to the object 51 having the remote-control transmitter 50 is sent thereto. Based on the measured distance data (#705) in addition to the focal length data of a photographic lens (not shown), a light measuring zone of the light measuring sensor 67 of FIG. 9(c) to be selected is determined (#706). The light measuring device 45 is then given a control signal which commands it to perform light measurement(#707) in such a way that, for example, when the focal length of the photographic lens is long, or when the object distance is short (in this case, the proportion of the area the image of the main object occupies in the picture frame is comparatively large), the light measuring zones "67a+67b+67c" are used. When the focal length of the photographic lens is short, or when the object distance is far, the light measuring zone 67a only is used when the light measurement is carried out.

According to the foregoing embodiment, the location of the image of the object 51 having the remote-control transmitter 50 in the picture frame is detected, and the data of the distance measured at this location is used for controlling the exposure. Therefore, without making wrong judgment of, for example, the back lighting situation, it becomes possible to derive always a correct exposure for the person having the remote-control transmitter 50 presumed to be the subject of principal interest.

It should be noted in the above-described embodiments that, as the camera body is not mounted on the camera fixing member, when the alteration of the angle, though necessary, is impossible to do, the above-described sequence of operations is prohibited, because the switch 10 or 50 is off.

It is also needless to say that in the above-described embodiment, after all the above-described operations have been completed, an exposure operation and other operations are carried out.

Though the foregoing embodiments have been described by taking an example of the camera having remote-control capabilities, it is to be understood that the invention is applicable even to the ordinary camera which is responsive to the heat or sound the object emits instead of the remote-control signal.

What is claimed is:

1. A camera system comprising:
   (A) direction finding means for determining a direction in which an object to be photographed is present; and
   (B) detection means operable for detecting a distance to said object and processing the detected distance, said detection means being prohibited from operating until the direction is determined by said direction finding means and, said detection means detecting the distance to said object in a direction determined by said direction finding means after completion of the direction finding operation.

2. A camera system according to claim 1, wherein said system includes direction altering means for turning the camera system toward the direction in which said object is located on the basis of the output of said direction finding means, said detection means starting the distance detection operation after the camera system is directed toward the object by said direction altering means.

3. A camera system according to claim 1, wherein said direction finding means includes means for determining the direction in which said object is located on the basis of a remote-control signal.

4. A camera system according to claim 1, wherein said direction finding means includes means for determining the direction in which said object is located on the basis of a received position of a remote-control signal.

5. A camera system according to claim 1, wherein said detection means includes multi-point distance measuring means for obtaining distance information of the direction in which said object is located at a plurality of points in a vertical direction.

6. A camera system according to claim 5, wherein said multi-point distance measuring means includes direction altering means for turning the camera system upward or downward.

7. A camera system according to claim 5, wherein said multi-point distance measuring means includes altering means for turning the direction of action upward or downward.

8. A camera according to claim 5, wherein said multi-point distance measuring means includes second direction finding means for judging the situation of the object on the basis of the direction in which said distance information varies.

9. A camera system according to claim 1, further comprising second direction finding means for judging the situation of the object on the basis of an output of said detection means.

10. A camera system according to claim 9, further comprising: focal length setting means responsive to an output of said second direction finding means for setting a focal length of a photographic optical system.

11. A camera system according to claim 2, further comprising switch means for judging whether or not said direction altering means is attached to the camera system.

12. A camera system according to claim 11, wherein said detection means is arranged to be rendered inoperative in response to an output of said switch means when said altering means is not attached to the camera system.

13. A camera system comprising:
   (A) direction finding means for determining a direction in which an object to be photographed is present; and
   (B) light measuring means operable for seeking a light measuring information of an object in a direction determined by said direction finding means after the direction finding operation, said light measuring means being prohibited from operating until the direction is determined.

14. A camera system according to claim 13, wherein said camera system includes means for changing a direction of the camera system.

15. A camera system according to claim 13, wherein said light measuring means includes means for changing a manner of light measuring.

16. A camera system according to claim 13, wherein said light measuring means includes means for substantially changing a direction of light measuring.

17. A camera system according to claim 13, wherein said direction finding means includes means for determining the direction in which said object is located on the basis of a received position of a remote-control signal.

18. A camera system according to claim 13, wherein said light measuring means includes means for considering a distance of the object for seeking light measuring information.

19. A camera system according to claim 13 wherein said light measuring means includes means for considering a focal length of a photographic optical system.

20. A camera system according to claim 13, wherein said light measuring means includes means for considering a focal length of a photographic optical system.

21. A device for interrelating an object and a camera comprising:
   (A) direction finding means for determining a direction in which an object to be photographed is present;
   (B) detection means operable for detecting a distance to said object; and
   (C) control means for first operating said direction finding means and thereafter operating said detection means such that distance detection thereby is made in the direction determined by said direction finding means, said control means prohibiting the distance detection by the detection means until the direction of the object is detected by the direction finding means.

22. A device according to claim 21, wherein said device includes direction altering means for turning the camera toward the direction in which said object is located on the basis of the determination of said direction finding means.

23. A device according to claim 21, wherein said direction finding means includes means for determining the direction in which said object is located on the basis of a remote-control signal.

24. A device according to claim 21, wherein said direction finding means includes means for determining the direction in which said object is located on the basis of a received position of a remote-control signal.

25. A device according to claim 21, wherein said detection means includes multi-point distance measuring means for obtaining distance information of the direction in which said object is located at a plurality of points in a vertical direction.

26. A device according to claim 25, wherein said multi-point distance measuring means includes direction altering means for turning the camera upward or downward.

27. A device according to claim 25, wherein said multi-point distance measuring means includes altering means for turning a direction of action upward or downward.

28. A device according to claim 27, wherein said altering means includes means for acting on until said distance information changes.

29. A device according to claim 28, further comprising second direction finding means for judging the situation of the object on the basis of the acting direction of said multi-point distance measuring means in which said distance information changes.

30. A device according to claim 29, further comprising direction setting means responsive to an output of said second direction finding means for setting a direction of the camera.

31. A device according to claim 29, further comprising focal length setting means responsive to an output of said second direction finding means for setting a focal length of a photographic optical system.

32. A device according to claim 27, wherein said altering means includes means for acting on until a limit of a range of movement is reached.

33. A device according to claim 25, wherein said multi-point distance measuring means includes second direction finding means for judging the situation of the object on the basis of the direction in which said distance information varies.

34. A device according to claim 33, further comprising: direction setting means responsive to an output of said second direction finding means for setting a direction of the camera.

35. A device according to claim 33, further comprising: focal length setting means responsive to an output of said second direction finding means for setting a focal length of a photographic optical system.

36. A device according to claim 21, further comprising second direction finding means for judging the situation of the object on the basis of an output of said detection means.

37. A device according to claim 36, further comprising: direction setting means responsive to an output of said second direction finding means for setting a direction of the camera.

38. A device according to claim 36, further comprising: focal length setting means responsive to an output of said second direction finding means for setting a focal length of a photographic optical system.

39. A device according to claim 22, further comprising switch means for judging whether or not said direction altering means is attached to the camera.

40. A device according to claim 29, wherein said detection means is arranged to be rendered inoperative in response to an output of said switch means when said altering means is not attached to the camera.

41. A device according to claim 37, wherein said direction setting means includes means for taking into consideration the focal length of a photographic optical system when setting a direction of the camera.

42. A device according to claim 21, wherein said device includes means for changing a direction of the camera.

43. A device according to claim 21, wherein said device includes means for detecting objects in a plurality of directions.

44. A device for interrelating an object and a camera comprising:
  (A) direction finding means for determining a direction in which an object to be photographed is present;
  (B) light measuring means operable for seeking light measuring information; and
  (C) control means for first operating said direction finding means and thereafter operating said light measuring means such that light measuring information sought thereby is sought in the direction determined by said direction finding means, said control means prohibiting the seeking operation by the light measuring means until the direction is determined by the direction finding means.

45. A device according to claim 44, wherein said direction finding means includes means for judging the direction in which said object is located on the basis of a remote-control signal.

46. A device according to claim 44, wherein said device means includes means for changing a direction of the camera.

47. A device according to claim 44, wherein said light measuring means includes means for changing a manner of light measuring.

48. A device according to claim 44, wherein said light measuring means includes means for substantially changing a direction of light measuring.

49. A device according to claim 44, wherein said direction finding means includes means for judging the direction in which said object is located on the basis of a received position of a remote-control signal.

50. A device according to claim 44, wherein said light measuring means includes means for considering a distance of the object for seeking light measuring information.

51. A device according to claim 50 wherein said light measuring means includes means for considering a focal length of a photographic optical system.

52. A device according to claim 44, wherein said light measuring means includes means for considering a focal length of a photographic optical system.

53. A camera system comprising:
  (a) first detection means for detecting a direction of an object with respect to a camera;
  (b) second detection means for detecting a distance of the object; and
  (c) control means for controlling an angle of elevation of a photographic optical axis of the camera on the basis of detection results by the first and second detection means.

54. A camera system according to claim 53, wherein said control means includes means for directing a photographic optical system of said camera system toward the object on the basis of the detection result of the first detection means.

55. A camera system according to claim 53, wherein said control means controls the angle of elevation of the photographic optical axis by driving a body of the camera.

56. A camera system comprising:
  (a) first detection means for detecting a direction of an object with respect to a camera;
  (b) second detection means for detecting a distance of the object; and
  (c) control means for controlling a proportion of the object image occupying a picture a screen on the basis of detection results by the first and second detection means.

57. A camera system according to claim 56, wherein said control means controls a focal length of a photographic optical system of said camera system.

58. A camera system according to claim 56, wherein said control means includes means for directing a photographic optical system of said camera system toward the object on the basis of the detection result of the first detection means.

59. A camera system according to claim 56, wherein said control means controls the angle of elevation of the photographic optical axis by driving a body of the camera.

60. A camera system, comprising:
    (a) detection means for detecting at least one of a position, a height and a size in a vertical direction of an object image in a photographic picture screen of a camera; and
    (b) a control circuit for controlling an angle of elevation of a photographic optical axis of the camera on the basis of detection results by the detection means.

61. A camera system according to claim 60, wherein said detection means has distance measurement means for measuring a distance of the object at different positions in a vertical direction of the scene and computing means for computing at least one of the position in of the vertical direction, the height and the size of the object image with respect to the scene on the basis of each distance measurement value.

62. A camera system, comprising;
    (a) detection means for detecting at least one of a position, a height and a size in a vertical direction of an object image in a photographic scene; and
    (b) control means for controlling a proportion of the object image occupying the scene on the basis of detection results by the detection means.

63. A camera system according to claim 62, wherein said control means controls a focal length of a photographic optical system of said camera system.

64. A camera system according to claim 63, wherein said detection means has distance measurement means for measuring a distance of the object at different positions in a vertical direction of the scene and computing means for computing at least one of the position in vertical direction, the height and the size of the object image with respect to the scene on the basis of each distance measurement value.

65. A camera system, comprising;
    (a) first detection means for detecting a direction of an object with respect to a camera;
    (b) light measurement means for light-measuring plural portions of a scene; and
    (c) a control circuit for adjusting processing of light measurement value of each portion of the scene in accordance with the direction of the object detected by the first detection means.

* * * * *

UNITED STATES PATENT AND TRADEMARK OFFICE
CERTIFICATE OF CORRECTION

PATENT NO. : 5,361,115
DATED : November 1, 1994
INVENTOR(S) : Masanori Ohtsuka et al.

It is certified that error appears in the above-identified patent and that said Letters Patent is hereby corrected as shown below:

Col. 4, line 39. Change "data, in other words, In" to -- data. In other words, in --.

Col. 4, line 56. Change "And" to -- and --.

Col. 5, line 49. Delete "is" (second occurrence).

Col. 6, line 8. Change "And" to -- and --.

Col. 10, line 28. Change "13" to -- 18 --.

Col. 12, line 68. Delete "a" (second occurrence).

Col. 13, line 29. Change "position" to -- positions -- and delete "of".

Col. 13, line 30. Change "the" to -- a --. (1st occurrence)

Col. 14, line 17. Change "position in" to -- positions in a --.

Signed and Sealed this

Seventh Day of March, 1995

Attest:

BRUCE LEHMAN

*Attesting Officer*          *Commissioner of Patents and Trademarks*